(12) United States Patent
Hashimoto (10) Patent No.: US 10,229,049 B2
(45) Date of Patent: Mar. 12, 2019

(54) STORAGE SYSTEM THAT PERFORMS HOST-INITIATED GARBAGE COLLECTION

(71) Applicant: TOSHIBA MEMORY CORPORATION, Tokyo (JP)

(72) Inventor: Daisuke Hashimoto, Cupertino, CA (US)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 15/253,661

(22) Filed: Aug. 31, 2016

(65) Prior Publication Data

US 2017/0177469 A1    Jun. 22, 2017

Related U.S. Application Data

(60) Provisional application No. 62/268,906, filed on Dec. 17, 2015.

(51) Int. Cl.
*G06F 3/06* (2006.01)
*G06F 12/02* (2006.01)

(52) U.S. Cl.
CPC ........ *G06F 12/0246* (2013.01); *G06F 3/0604* (2013.01); *G06F 3/064* (2013.01); *G06F 3/0652* (2013.01); *G06F 3/0659* (2013.01); *G06F 3/0679* (2013.01); *G06F 2212/214* (2013.01); *G06F 2212/7201* (2013.01); *G06F 2212/7205* (2013.01)

(58) Field of Classification Search
CPC ...... G06F 3/0604; G06F 3/064; G06F 3/0652; G06F 3/0659; G06F 3/0679; G06F 12/0246; G06F 2212/214; G06F 2212/7201; G06F 2212/7205

See application file for complete search history.

(56) References Cited

U.S. PATENT DOCUMENTS

| | | | |
|---|---|---|---|
| 7,444,462 B2 * | 10/2008 | Traister | G06F 12/0269 711/103 |
| 8,032,724 B1 | 10/2011 | Smith | |
| 8,041,878 B2 | 10/2011 | Lee | |
| 8,364,918 B1 | 1/2013 | Smith | |
| 8,843,712 B1 | 9/2014 | Smith | |
| 8,874,872 B2 | 10/2014 | Feldman et al. | |
| 8,935,302 B2 | 1/2015 | Flynn et al. | |
| 9,026,734 B2 | 5/2015 | Hashimoto | |
| 9,026,764 B2 | 5/2015 | Hashimoto | |
| 2012/0151124 A1 * | 6/2012 | Baek | G06F 12/0246 711/103 |
| 2012/0246388 A1 | 9/2012 | Hashimoto | |

(Continued)

*Primary Examiner* — Aracelis Ruiz
(74) *Attorney, Agent, or Firm* — Kim & Stewart LLP (57) ABSTRACT

A storage device includes a non-volatile semiconductor storage device including a plurality of physical blocks, and a controller. The controller maintains a mapping of logical addresses to locations within the physical blocks, receives, from a host, a command to start host initiated garbage collection where the controller copies data from an active block into an input block having free pages that is not written after erase operation, receives, from the host, a command to receive data to be written from the host, writes the received data to the same input block, and receives, from a host, another command to start host initiated garbage collection where the controller copies data from an active block into the same input block.

19 Claims, 10 Drawing Sheets

(56) References Cited

U.S. PATENT DOCUMENTS

| | | |
|---|---|---|
| 2014/0173268 A1 | 6/2014 | Hashimoto |
| 2014/0215129 A1 | 7/2014 | Kuzmin et al. |
| 2014/0281338 A1 | 9/2014 | Choi et al. |
| 2014/0365719 A1 | 12/2014 | Kuzmin et al. |
| 2015/0331624 A1 | 11/2015 | Law |
| 2015/0347025 A1 | 12/2015 | Law |

* cited by examiner

STORAGE SYSTEM THAT PERFORMS HOST-INITIATED GARBAGE COLLECTION

CROSS-REFERENCE TO RELATED APPLICATION

This application is based upon and claims the benefit of priority from Provisional Application No. 62/268,906, filed Dec. 17, 2015, the entire contents of which are incorporated herein by reference.

FIELD

The present disclosure relates to host-initiated garbage collection performed in a host-managed SSD.

BACKGROUND

A storage system usually includes a host and a storage device, such as a non-volatile memory device. The storage device typically includes a plurality of physical blocks for storing data, and upon receiving a write command from the host, writes data to one of the physical blocks that is designated for writing the data. After the data are written to the storage device, the host may send a command (trim command) to invalidate the written data, for example when new data are overwritten. As a result, data written in the storage device may include both valid and invalid data.

When a capacity of free space in the physical blocks decreases to a certain level, one type of storage device carries out garbage collection (GC) with respect to some of the physical blocks in which data are written. Garbage collection is a process of copying all valid data from target physical blocks to another physical block, and erasing the target physical blocks. By erasing the target physical blocks, the target physical blocks can be used for new data writing.

However, if the garbage collection is carried out in the storage device when the host transmits an access command (e.g., a write command and a read command) to the storage device, the access command cannot be carried out immediately, and need to be carried out after the garbage collection ends. As a result, latency of the access increases.

In one type of a storage system, the host can control the timing to perform the GC, that is, performs host-initiated garbage collection using a function of background operation control. Specifically, the host-initiated garbage collection may be performed when the host is in an idle state, that is, the host does not transmit access commands to the storage device, and not performed when the host is in a busy state, that is, the host transmits access commands to the storage device. As a result, conflict between operation of the garbage collection and access operation can be avoided.

Such garbage collection is conventionally carried out in unit of block. That is, valid data that amount to a size of one block are collected from a plurality of active blocks, and the one block is filled with the collected valid data. However, it may take several hundred milliseconds to fill the entire block with the collected valid data, and during the period to fill the block, no access from the host to the storage device can be performed. Conversely, if a period during which the host becomes the idle state is less than the several hundred milliseconds, the host-initiated garbage collection may not be performed at all.

DETAILED DESCRIPTION

According to an embodiment, a storage device includes a non-volatile semiconductor storage device including a plurality of physical blocks, and a controller. The controller maintains a mapping of logical addresses to locations within the physical blocks, receives, from a host, a command to start host initiated garbage collection where the controller copies data from an active block into an input block having free pages that is not written after erase operation, receives, from the host, a command to receive data to be written from the host, writes the received data to the same input block, and receives, from a host, another command to start host initiated garbage collection where the controller copies data from an active block into the same input block.

Details of the present disclosure are described below with reference to drawings.

Figure 1:
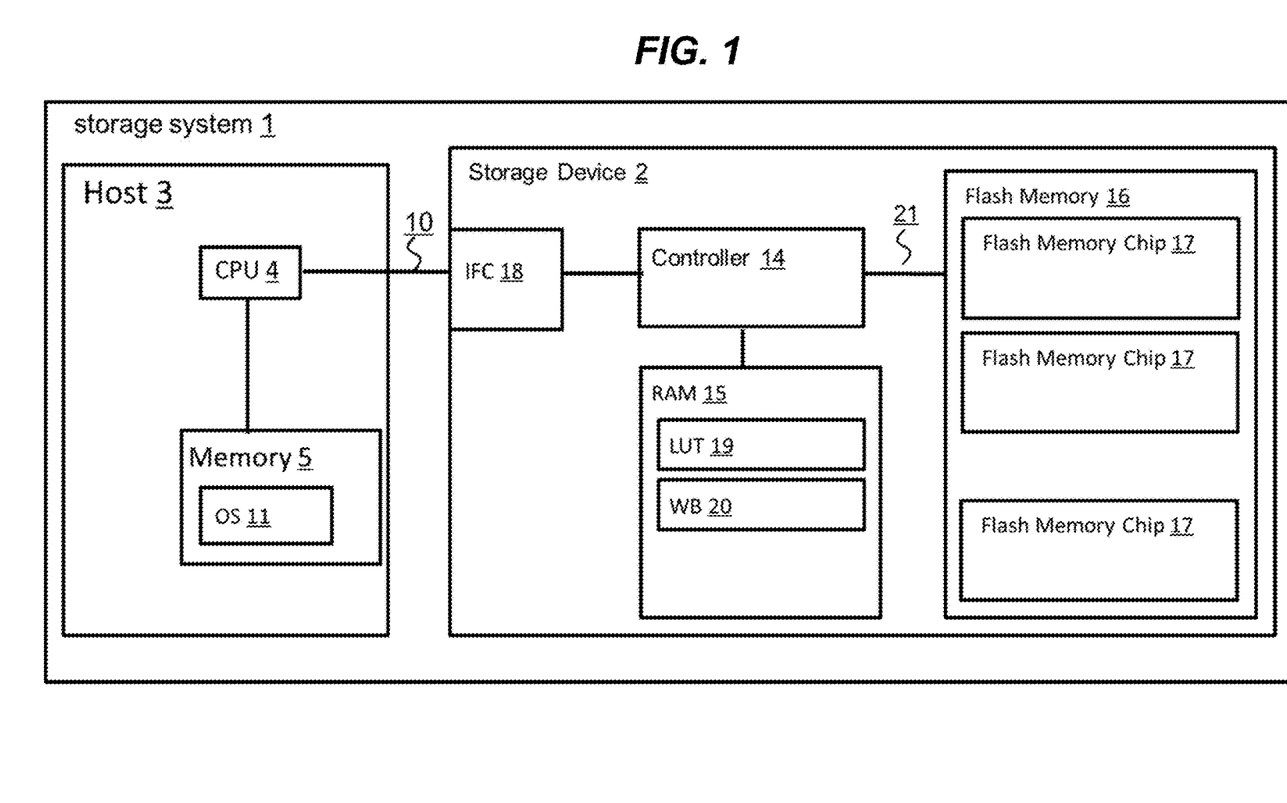
FIG. 1 illustrates a configuration of a storage system including a host and a storage device, according to an embodiment.

FIG. 1 illustrates a configuration of a storage system 1 coupled to a client via a network, according to an embodiment. The storage system 1 includes a host 3, one or more storage devices 2, and an interface 10 configured to connect the host 3 and storage devices 2. In the present embodiment, the storage device 2 is, for example, an SSD (Solid State Drive), which is a nonvolatile storage device. Alternatively, the storage device 2 can include other storage devices such as a hard disk drive (HDD), a hybrid drive, an SD card, a USB memory, an embedded Multi Media Card (eMMC), and a storage device and a memory node described in United States Patent Application Publication No. 2012/0117354. Further, in the present embodiment, the interface 10 uses SAS (Serial Attached SCSI). Alternatively, the interface 10 can use any other technically feasible protocol, such as PCI Express (Peripheral Component Interconnect Express, PCIe), USB (Universal Serial Bus), SATA (Serial Advanced Technology Attachment), Thunderbolt (registered trademark), Ethernet (registered trademark), Fibre channel, and the like.

The host 3 includes a CPU (processing unit) 4 and memory 5. The CPU 4 is a central processing unit in the host 3, and performs various calculations and control operations in the host 3. The CPU 4 performs control of the memory 5. The memory 5 is, for example, a DRAM (Dynamic Random Access Memory), a MRAM (Magnetoresistive Random Access Memory), a ReRAM (Resistance Random Access Memory), and a FeRAM (Ferroelectric Random Access Memory).

The CPU 4 is a processor configured to control the operation of the host 3. The CPU 4 executes, for example, an operating system (OS) 11 loaded from one of the storage devices 2 to the memory 5.

The memory 5 temporarily stores a program and data and functions as an operational memory of the CPU 4. The memory 5 includes a storage region for storing OS 11, a storage area for storing a file system, and a storage region for storing application software. As is generally known, the OS 11 is a program for managing the entire host 3, such as Linux, Windows Server, VMWARE Hypervisor, and etc., and operates to manage an input to and an output from the host 3, the storage devices 2, and the memory 5, and enable software to use components in the storage system 1, including the storage device 2.

The host 3 sends, via the interface 10, a variety of commands for data writing to and data reading from the storage device 2. The commands include a write command, a read command, a flush command, start host-initiated garbage collection (Start HIGC) command, and the like, as described below in detail.

[Storage Device]

As shown in FIG. 1, the storage device 2, which functions as an SSD, includes a controller 14, a random access memory (RAM) 15, a non-volatile semiconductor memory, such as a NAND flash memory 16 (hereinafter flash memory), and an interface controller (IFC) 18. The IFC 18 is configured to perform transmission and reception of signals to and from the host 3 via the interface 10. The RAM 15 functions as a semiconductor memory, and includes a region storing a look-up table (LUT) 19 for managing mappings between LBAs and physical addresses of the flash memory 16, and a write buffer (WB) 20. The controller 14 is configured to manage and control the flash memory 16, the RAM 15, and the IFC 18.

The RAM 15 is, for example, a volatile RAM, such as a DRAM (Dynamic Random Access Memory) and a SRAM (Static Random Access Memory), or a nonvolatile RAM, such as a FeRAM (Ferroelectric Random Access Memory), an MRAM (Magnetoresistive Random Access Memory), a PRAM (Phase Change Random Access Memory), and a ReRAM (Resistance Random Access Memory). The RAM 15 may be embedded in the controller 14.

The flash memory 16 includes one or more flash memory chips 17 and stores user data designated by the host 3 in one or more of the flash memory chips 17. The controller 14 and the flash memory 16 are connected via a flash memory interface 21, such as Toggle and ON FI.

[Flash Memory Chip]

Figure 2:
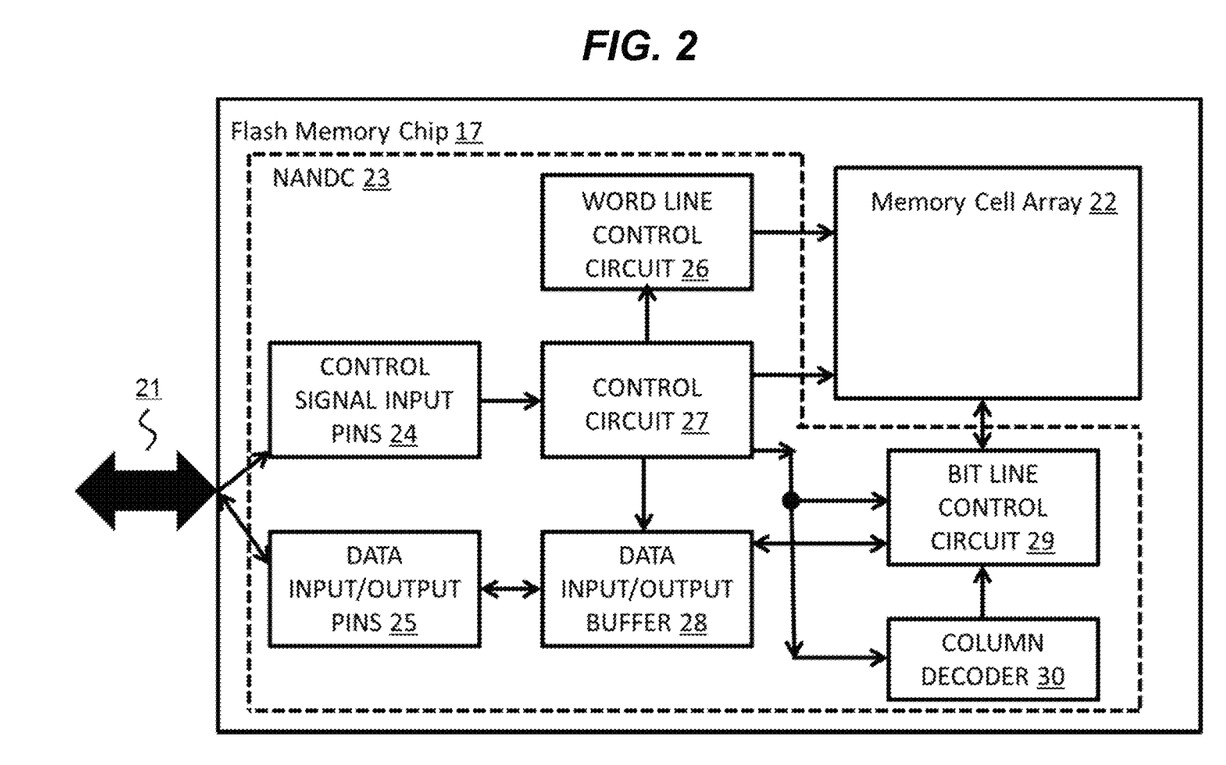
FIG. 2 illustrates a configuration of a flash memory chip in the storage device.

FIG. 2 illustrates a configuration of the flash memory chip 17. The flash memory chip 17 includes a memory cell array 22 and a NAND controller (NANDC) 23. The memory cell array 22 includes a plurality of memory cells arranged in a matrix configuration, each stores data, as described below in detail. The NANDC 23 is a controller configured to control access to the memory cell array 22.

Specifically, the NANDC 23 includes signal input pins 24, data input/output pins 25, a word line control circuit 26, a control circuit 27, a data input/output buffer 28, a bit line control circuit 29, and a column decoder 30. The control circuit 27 is connected to the signal input pins 24, the word line control circuit 26, the data input/output buffer 28, the bit line control circuit 29, and the column decoder 30, and entirely controls circuit components of the NANDC 23.

Also, the memory cell array 22 is connected to the word line control circuit 26, the control circuit 27, and the data input/output buffer 28. Further, the signal input pins 24 and the data input/output pins 25 are connected to the controller 14 of the storage device 2, through the flash interface 21.

When data are read from the flash memory chip 17, data in the memory cell array 22 are output to the bit line control circuit 29 and then temporarily stored in the data input/output buffer 28. Then, the read data RD are transferred to the controller 14 of the storage device 2 from the data input/output pins 25 through the flash interface 21. When data are written to the flash memory chip 17, data to be written (write data WD) are input to the data input/output buffer 28 through the data input/output pins 25. Then, the write data WD are transferred to the column decoder 30 through the control circuit 27, and input to the bit line control circuit 29 by the column decoder 30. The write data WD are written to memory cells of the memory cell array 22 with a timing controlled by the word line control circuit 26 and the bit line control circuit 29.

When control signals CS are input to the flash memory chip 17 from the controller 14 of the storage device 2 through the flash interface 21, the control signals CS are input through the control signal input pins 24 into the control circuit 27. Then, the control circuit 27 generates control signals CS', according to the control signals CS from the controller 14, and controls voltages for controlling memory cell array 22, bit line control circuit 29, column decoder 30, data input/output buffer 28, and word line control circuit 26. Here, a circuit section that includes the circuits other than the memory cell array 22 in the flash memory chip 17 is referred to as the NANDC 23.

Figure 3:
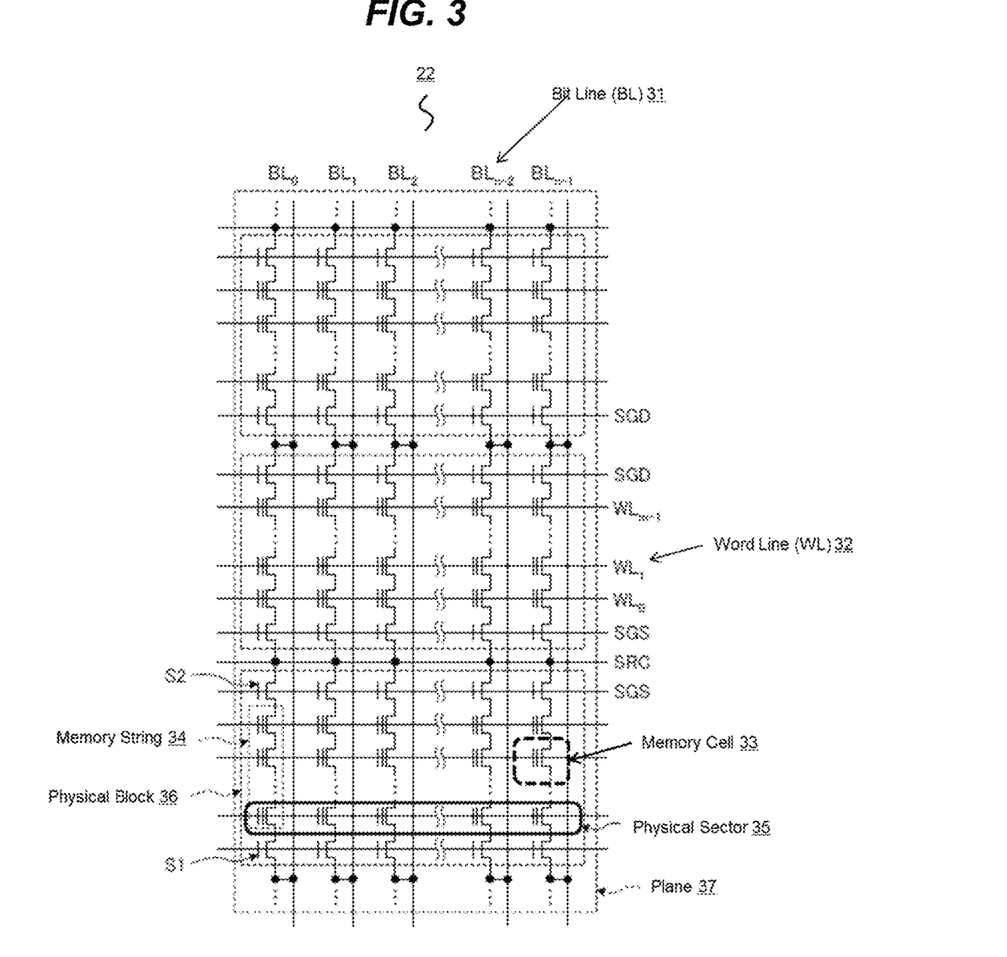
FIG. 3 illustrates a detailed circuit structure of a memory cell array in the flash memory chip.

FIG. 3 illustrates detailed circuit structure of the memory cell array 22. The memory cell array 22 includes one or more planes 37, each plane 37 includes a plurality of physical blocks 36, and each physical block 36 includes a plurality of memory strings 34. Further, each of the memory strings (MSs) 34 includes a plurality of memory cells 33.

The memory cell array 22 further includes a plurality of bit lines 31, a plurality of word lines 32, and a common source line. The memory cells 33, which are electrically data-rewritable, are arranged in a matrix configuration at intersections of bit lines 31 and the word lines. The bit line control circuit 29 is connected to the bit lines 31 and the word line control circuit 26 is connected to the controlling word lines 32, so as to control data writing and reading with respect to the memory cells 33. That is, the bit line control circuit 29 reads data stored in the memory cells 33 via the bit lines 31 and applies a write control voltage to the memory cells 33 via the bit lines 31 and writes data in the memory cells 33 selected by the word line 32.

In each MS 34, the memory cells 33 are connected in series, and selection gates S1 and S2 are connected to both ends of the MS 34. The selection gate S1 is connected to a bit line BL 31 and the selection gate S2 is connected to a source line SRC. Control gates of the memory cells 33 arranged in the same row are connected in common to one of word lines 32 WL0 to WLm−1. First selection gates S1 are connected in common to a select line SGD, and second selection gates S2 are connected in common to a select line SGS.

A plurality of memory cells 33 connected to one word line 32 configures one physical sector 35. Data are written and read for each physical sector 35. In the one physical sector 35, data equivalent to two physical pages (two pages) are stored when 2 bit/cell write system (MLC, four-level) is employed, and data equivalent to one physical page (one page) are stored when 1 bit/cell write system (SLC, two-level) is employed. Further, when 3 bit/cell write system (TLC, eight-level) is employed, data equivalent to three physical pages (three pages) are stored in the one physical sector 35. Further, data are erased in a unit of the physical block 36.

During a write operation, a read operation, and a program verify operation, one word line WL is selected according to a physical address, such as a Row Address, received from the controller 14, and, as a result, one physical sector 35 is selected. Switching of a page in the selected physical sector 35 is performed according to a physical page address in the physical address. In the present embodiment, the flash memory 16 employs the 2 bit/cell write method, and the controller 14 controls the physical sector 35, recognizing that two pages, i.e., an upper page and a lower page, are allocated to the physical sector 35, as physical pages. A physical address comprises physical page addresses and physical block address. A physical page address is assigned to each of the physical pages, and a physical block address is assigned to each of the physical blocks 36.

Figure 4:
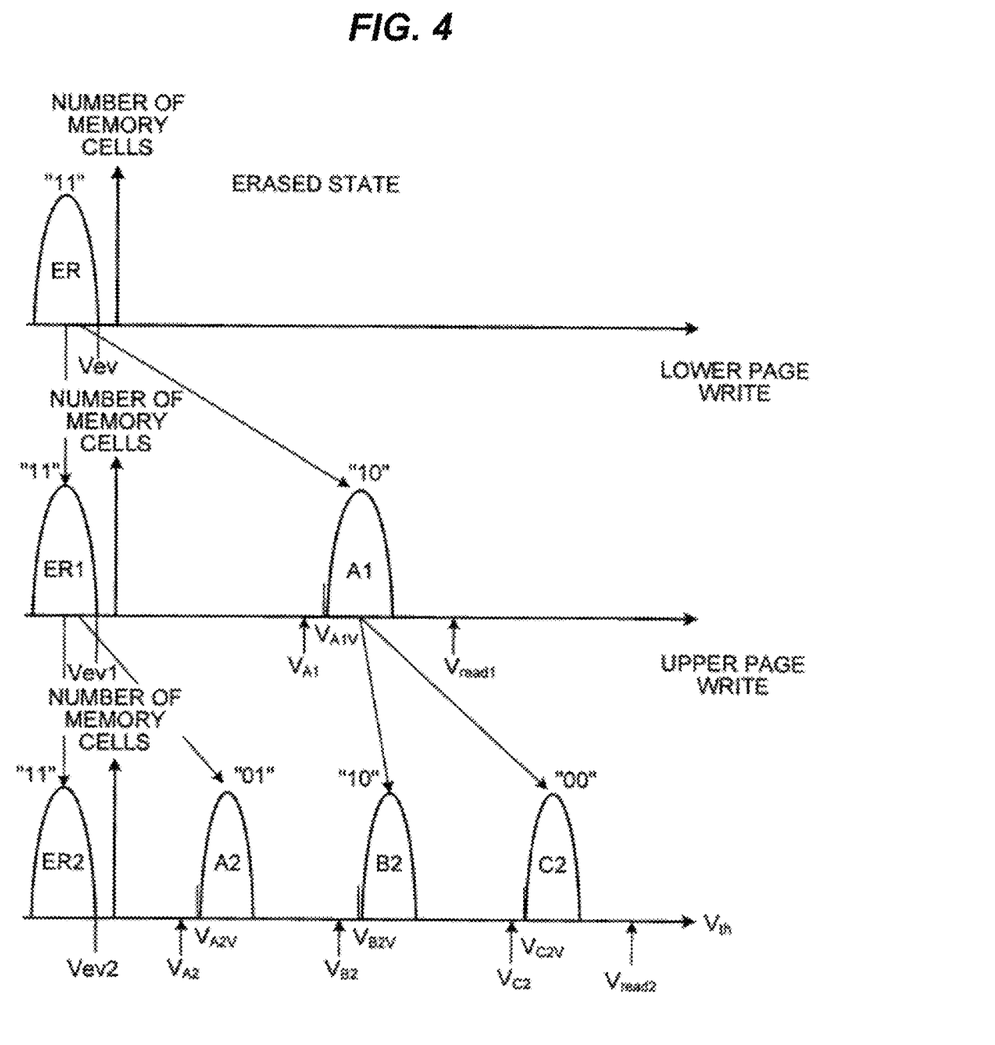
FIG. 4 illustrates a relation between 2-bit four-level data (data "11", "01", "10", and "00") stored in a memory cell of a four-level NAND cell type and a threshold voltage distribution of each level.

The four-level NAND memory of 2 bit/cell is configured such that a threshold voltage in one memory cell could have four kinds of distributions. FIG. 4 illustrates a relation between 2-bit four-level data (data "11", "01", "10", and "00") stored in a memory cell 33 of a four-level NAND cell type and a threshold voltage distribution of each level. 2-bit data of one memory cell 33 includes lower page data and upper page data. The lower page data and the upper page data are written in the memory cell 33 according to separate write operations, i.e., two write operations. Here, when data are represented as "XY," "X" represents the upper page data and "Y" represents the lower page data.

Each of the memory cells 33 includes a memory cell transistor, for example, a MOSFET (Metal Oxide Semiconductor Field Effect Transistor) having a stacked gate structure formed on a semiconductor substrate. The stacked gate structure includes a charge storage layer (a floating gate electrode) formed on the semiconductor substrate via a gate insulating film and a control gate electrode formed on the floating gate electrode via an inter-gate insulating film. A threshold voltage of the memory cell transistor changes according to the number of electrons accumulated in the floating gate electrode. The memory cell transistor stores data according to difference in the threshold voltage.

In the present embodiment, each of the memory cells 33 employs a write system of a four-level store method for 2 bit/cell (MLC), using an upper page and a lower page. Alternatively, the memory cells 33 may employ a write system of a two-level store method of 1 bit/cell (SLC), using a single page, an eight-level store method for 3 bit/cell (TLC), using an upper page, a middle page, and a lower page, or a multi-level store method for 4 bit/cell (QLC) or more, or mixture of them. The memory cell transistor is not limited to the structure including the floating gate electrode and may be a structure such as a MONOS (Metal-Oxide-Nitride-Oxide-Silicon) type that can adjust a threshold voltage by trapping electrons on a nitride interface functioning as a charge storage layer. Similarly, the memory cell transistor of the MONOS type can be configured to store data of one bit or can be configured to store data of a multiple bits. The memory cell transistor can be, as a nonvolatile storage medium, a semiconductor storage medium in which memory cells are three-dimensionally arranged as described in U.S. Pat. No. 8,189,391, United States Patent Application Publication No. 2010/0207195, and United States Patent Application Publication No. 2010/0254191.

[Block Management in the Storage Device]

Figure 5:
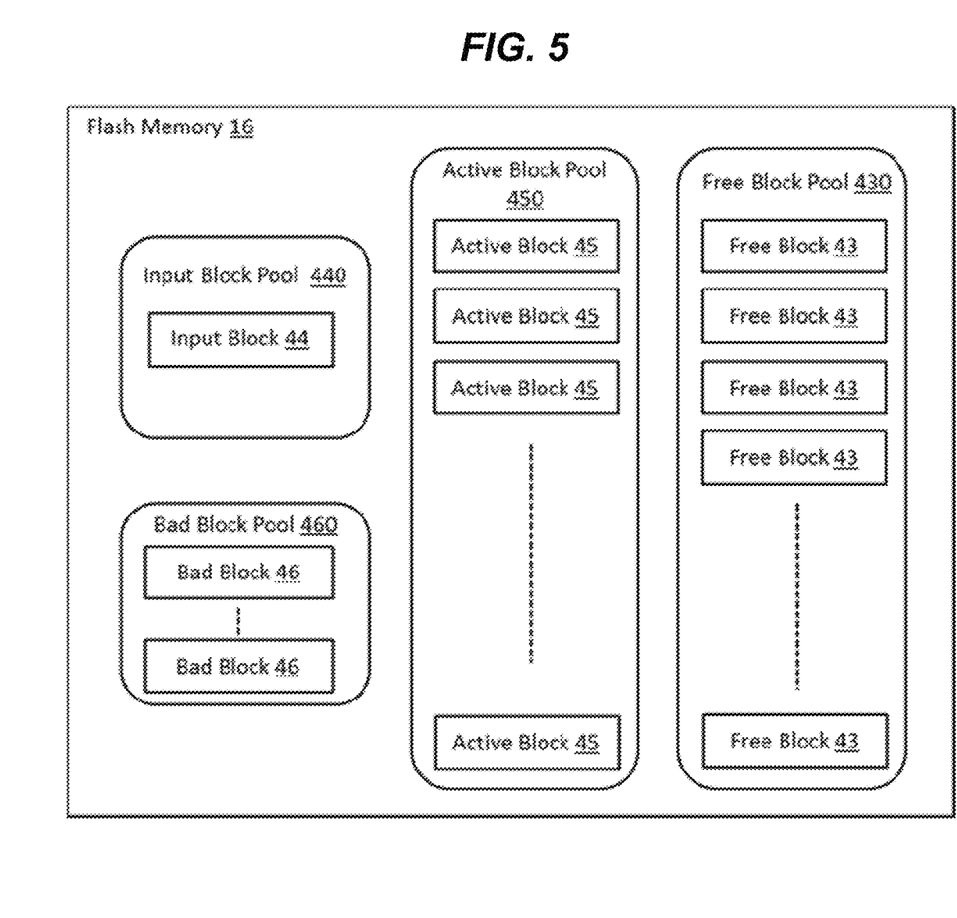
FIG. 5 illustrates an overview of mapping of physical blocks based on block pools in the embodiment.

According to the present embodiment, the controller 14 of the storage device 2 manages the physical blocks 36 of the flash memory 16, by logically mapping the block in one of several different block pools, using the LUT 19 (shown in FIG. 1). FIG. 5 illustrates an overview of the mapping of the physical blocks based on block pools. The block pools here include a free block pool 430, an input block pool 440, an active block pool 450, and a bad block pool 460. The controller 14 maps each of the physical blocks 36, in the LUT 19, based on whether or not data are stored in the block and a type of data stored in the block, if so.

When no valid data are stored in a block, then the controller 14 maps the block as a free block 43 and maps the free block 43 in the free block pool 430. That is, free blocks 43 in the free block pool 430 are physical blocks that currently do not store valid data. When the block has a space in which write data are supposed to be written, then the controller 14 maps the block as an input block 44 in the input block pool 440. That is, the input block 44 is a partially-written physical block into which the controller 14 can write data without first erasing the entire input block. In other words, there is an unwritten space in the input block 44. When the input block 44 becomes full, then the controller 14 remaps the input block 44 as an active block 46 and maps the active block 46 in the active block pool 460. That is, active blocks 46 are physical blocks that store valid data. When a block is defective, then the controller 14 maps the defective block as a bad block 46 and maps the bad block 46 in the bad block pool 460. That is, bad blocks 46 are physical blocks that are no longer usable for storing data.

In such a manner, the LUT 19 (shown in FIG. 1) manages a physical block address list of the free blocks 43, the input block 44, the active blocks 45, and the bad blocks 46, respectively. Other configurations of different types of block pools may be also managed in the LUT 19.

[Operations in the Storage System]

Next, various operations carried out in the storage system 1 according to the present embodiment are described, with reference to FIGS. 6-11.

Figure 6:
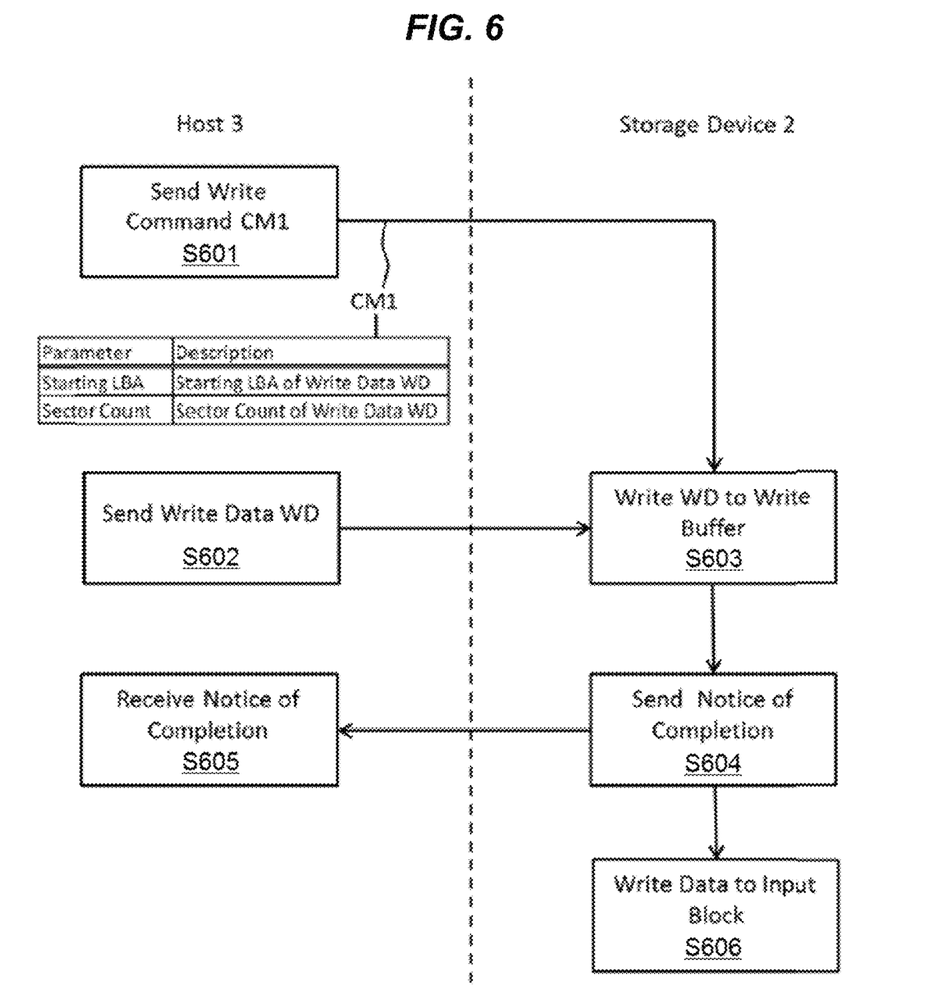
FIG. 6 is a flow chart showing an example of a write operation performed by the storage system.

FIG. 6 illustrates a flow of the write operation carried out in the storage system 1. When the write operation is carried out, the host 3 first transmits a write command (write request) CM1 to the storage device 2 via the interface 10 at Step S601.

When the host 3 transmits the write command CM1 to the storage device 2, the host 3 includes a logical address of block in which data are to be written, in the write command CM1. In the present embodiment, the logical address is LBA (Logical Block Address), but may be Object ID or Object Key, instead of LBA. The LBA is a logical address in which serial numbers are given to logical sectors (size: e.g., 512 Bytes) starting from 0. Thus, when the host 3 issues the write command CM1 to the storage device 2, the host 3 transmits the write command CM1, including a LBA (a starting LBA of the write data) and logical sector count (data size) for which the write command CM1 is issued.

The write command CM1 includes parameters of a starting LBA, which is a starting LBA in which data are to be written (write data WD) and a logical sector count of the write data WD. Then, the host 3 transmits the write data WD to the storage device 2 at Step S602. After the storage device 2 receives the write command CM1 and the write data WD, then the controller 14 of the storage device 2 stores the write data WD in the write buffer (WB) 20 at Step S603. Then, at Step S604, the controller 14 sends a notice of completion to the host 3. At Step S605, the host 3 receives the notice of completion from the storage device 2, and the write operation on the side of the host 3 ends.

Subsequently, the controller 14 writes the write data WD stored in the WB 20 to a portion of the flash memory 16 located at physical addresses corresponding to the LBA included in the write command CM1, by referring to the LUT 19, at Step S606. The mapping between the LBAs and the physical addresses are dynamic, so the mapping may be updated according to data management in the storage device 2.

Figure 7:
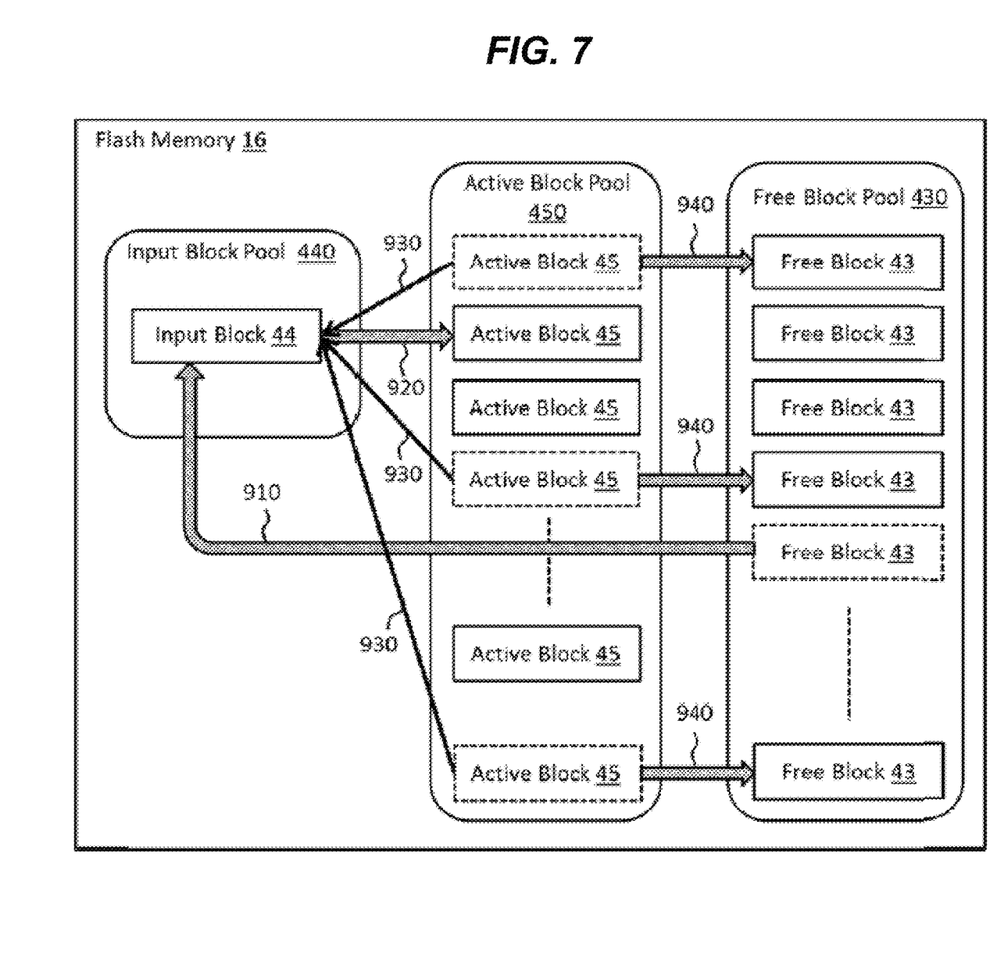
FIG. 7 schematically illustrates re-mapping of physical blocks.

There are some circumstances where the physical blocks of the flash memory 16 are remapped as a different block. FIG. 7 schematically illustrates re-mapping of physical blocks. As shown by an arrow 910, when there is no available input block 44 in the input block pool 440, the controller 14 re-maps (allocates) a free block 43 in the free block pool 430 as a new input block 44 and erases it. As shown by an arrow 920, when no physical page in an input block 44 is available for data writing without erasing written data, the controller 14 remaps (moves) the input block 44 as an active block 45 in the active block pool 450. Further, when there are insufficient free blocks 43 in the free block pool 430, the controller 14 of the storage device 2 carries out device-initiated garbage collection (DIGC) with respect to the active blocks 45 in the active block pool 450. During such garbage collection, as shown by arrows 930, the controller 14 of the storage device 2 copies valid data in active blocks 45 subject to the DIGC and transfers the copied valid data in an input block 44 to the input block pool 440. Further, during garbage collection, as shown by arrows 940, the controller 14 remaps the active blocks 45 from which valid data have been transferred as free blocks 43, by invalidating all data in the active blocks 45. The DIGC is initiated by the storage device 2.

Figure 8:
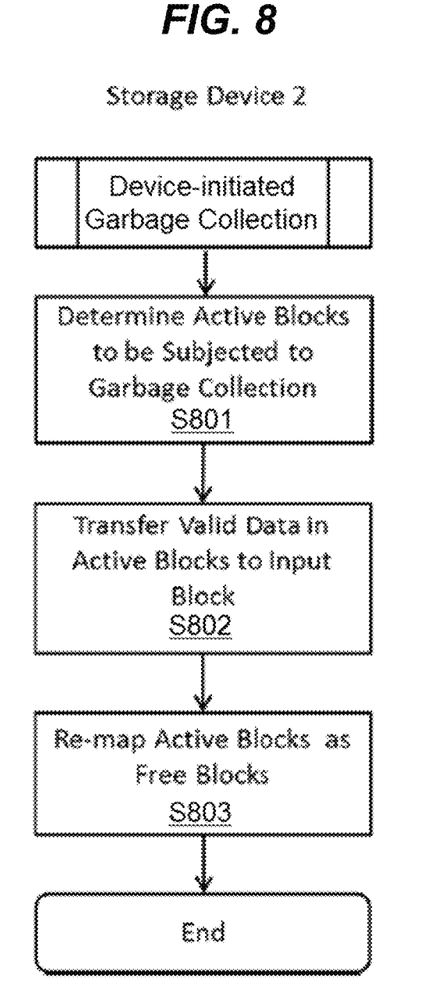
FIG. 8 is a flow chart showing an example of device-initiated garbage collection, which is performed by the storage device.

FIG. 8 illustrates a flow of the DIGC carried out in the storage device 2. When the DIGC is carried out, the controller 14 of the storage device 2 first determines active blocks 45 to undergo garbage collection, at Step S801. Here, various types of algorithms can be adopted to determine the active blocks 45 to be subjected to garbage collection (i.e., target active blocks). In one embodiment, active blocks 45 that store a higher ratio of invalid data with respect to valid data may be selected as the target active blocks. For example, in such an embodiment, the first active block 45 selected as the target active block may be the active block that contains the highest ratio of invalid data to valid data. Alternatively, the target active blocks may be determined based on a time when the block has been mapped as an active block 45 or on an age of data in the active blocks 45. That is, an active block 45 that has been mapped earlier than other active blocks 45 or an active block that includes the oldest valid data may be selected as the target active block.

Next, at Step S802, the controller 14 copies only valid data in the active blocks 45 that are selected as the target active blocks, and transfers the copied data to the input block 44. Here, if the input block 44 does not have sufficient capacity to store the copied data, the controller 14 remaps one or more of the free blocks 43 as new input block 44. Further, if the input block 44 to which the copied data are transferred becomes full during step S802, the controller 14 remaps the input block 44 as an active block 45 in the active block pool 450.

Then, at Step S803, the controller 14 invalidates all data stored in the target active blocks and remaps the target active blocks as free blocks 43 in the free block pool 430. Here, the remapping corresponds to updating the LUT 19 stored in the RAM 15 (FIG. 3) of the storage device 2. As a result, the DIGC ends.

Figure 9:
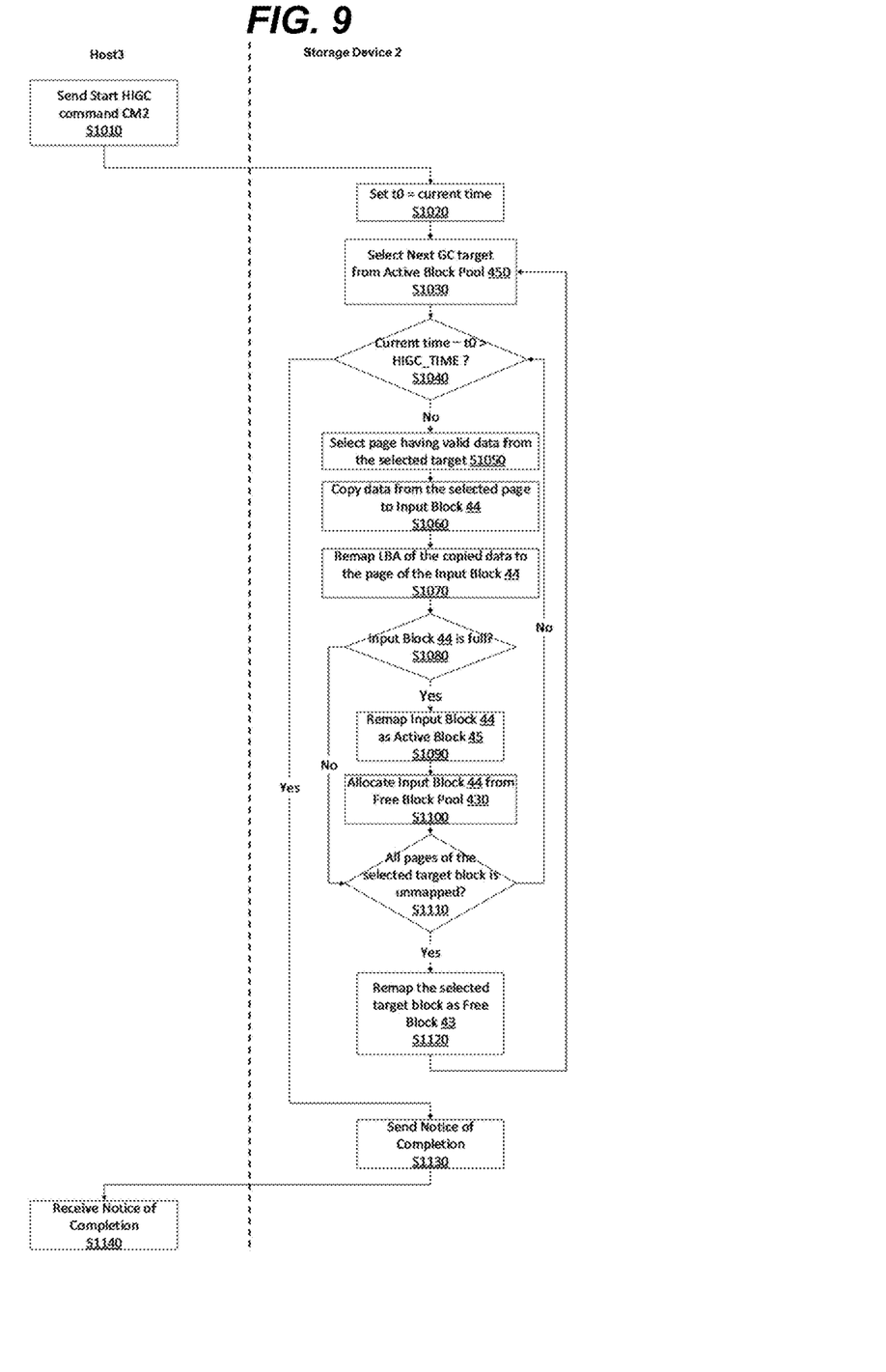
FIG. 9 is a flow chart showing an example of host-initiated garbage collection, which is performed by the host and the storage device.

FIG. 9 illustrates a flow of host-initiated garbage collection (HIGC) carried out by the host 3 and the storage device 2 of the storage system 1. The HIGC is initiated by the host 3.

When the host 3 initiates the HIGC, in Step S1010, the host 3 transmits a start host-initiated garbage collection command (Start HIGC command) to the storage device 2 through the interface 10. The Start HIGC command includes a parameter HIGC_TIME, which specifies the maximum time that the storage device 2 can perform the HIGC operation, in unit of milliseconds. That is, before the maximum time specified in the Start HIGC command passes, the controller of the storage device 2 can perform the host-initiated garbage collection.

In Step S1020, the controller 14 of the storage device 2 sets the current time as t0. Then, in Step S1030, the controller 14 of the storage device 2 determines active blocks 45 to undergo the host-initiated garbage collection, in a similar manner to Step S801.

In Step S1040, the controller 14 determines whether or not time passed (=current time−T0) is greater than the HIGC_TIME. If the determination result in Step S1040 is Yes, the process proceeds to Step S1130. That is, the host-initiated garbage collection is not (no longer) performed. If the determination result in Step S1040 is No, the process proceeds to Step S1050, and the host-initiated garbage collection is performed (further).

In Step S1050, the controller 14 selects one or more pages storing valid data from the target blocks selected in Step S1030. Then, in Step S1060, the controller 14 copies (transfers) the valid data in the selected pages to one or more pages of the input block 44. Further, in Step S1070, the controller 14 remaps LBA of the copied data to the one or more pages of the input block 44.

In Step S1080, the controller 14 determines whether or not the input block 44 in which the copied data are written becomes full. If the determination result in Step S1080 is No, then the process proceeds to Step S1110. If the determination result is Yes, then the process proceeds to Step S1090. In Step S1090, the controller 14 remaps the input block 44 that is determined to become full as an active block 45. Since a new input block 44 in which data are to be written is needed, in Step S1100, the controller 14 assigns (remaps) a new input block 44 from the free block pool 430.

In Step S1110, the controller 14 determines whether or not all selected pages of the target block is unmapped, that is, whether or not data in all selected pages of the target block are copied to the input block(s). If the determination result in Step S1110 is No, the process returns to Step S1040 (because more data should be copied from the target block.) If the determination result is Yes, then in Step S1120, the controller 14 remaps the target block as a free block 43.

In Step S1130, that is, if the passed time is determined to be greater than the HIGC_TIME in Step S1040, the controller 14 transmits a completion notice to the host 3. In Step S1140, the host 3 receives the completion notice from the storage device 2 and the period for the host-initiated garbage collection ends.

In the present embodiment, the host-initiated garbage collection is carried out according to the above procedure. Depending on the HIGC_TIME designated by the host 3, the number of pages that are subjected to the garbage collection may vary. The HIGC_TIME is short, then not all pages of the target block that store valid data may not be subjected to the garbage collection during a single garbage collection operation.

Figure 10:
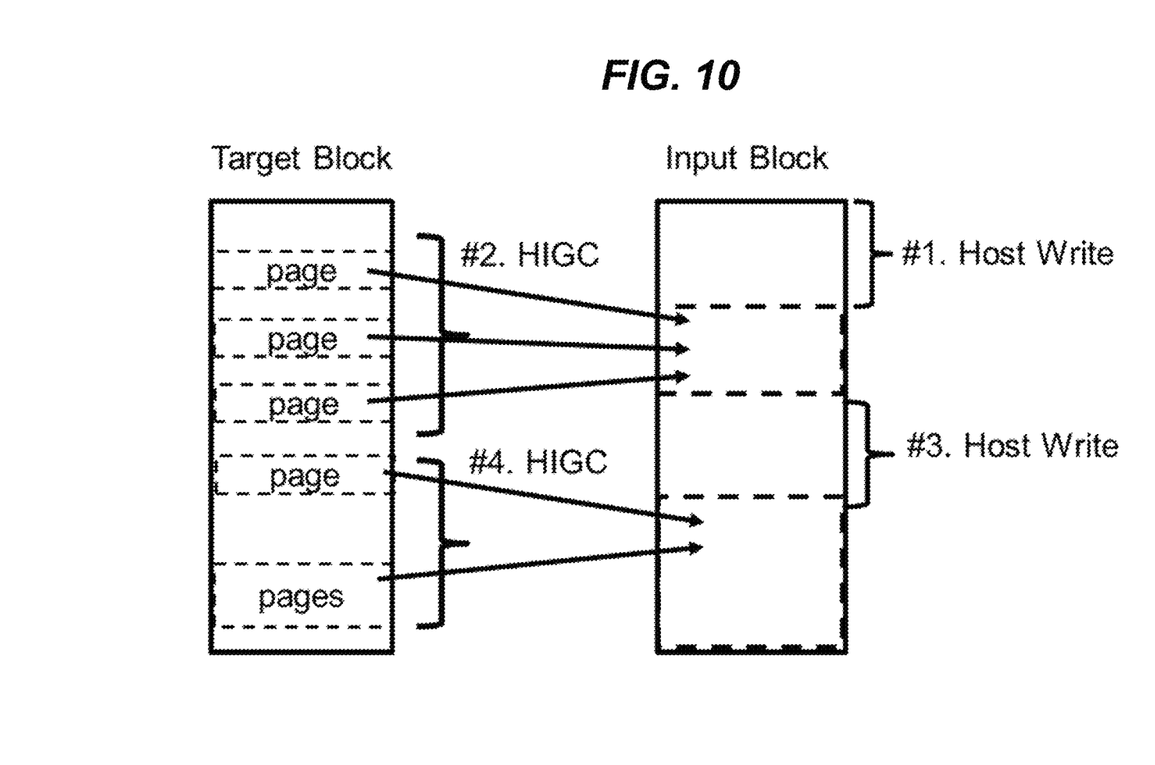
FIG. 10 conceptually illustrates data copy from a target block to an input block during the host-initiated garbage collection and contents in the input block.

In other words, even if the input block 44 has not become full or not all data in the target block of the host-initiated garbage collection have been invalidated, the process of the host-initiated garbage collection is interrupted when the HIGC_TIME has passed. After the HIGC_TIME has passed, the host 3 may operate to write data in the block that contains the copied data through the host-initiated garbage collection, in accordance with the write operation shown in FIG. 6. In that case, the input block 44 may contain both write data written in accordance with a write command, and copied data transferred in accordance with the Start HIGC command as shown in FIG. 10. That is, with respect to the input block 44, a write operation (#1), a host-initiated garbage collection (#2), a write operation (#3), and a host-initiated garbage collection (#4) may be performed in this order.

According to the present embodiment, the host-initiated garbage collection may be carried out in unit of page. As the input block 44 does not need to be filled with the copied data during a single garbage collection operation, unlike garbage collection in unit of block, the single garbage collection operation can be carried out in a period less than several hundred milliseconds. As a result, even if an idle time of the host 3 is short, the host-initiated garbage collection can be carried out in the short idle time. Conversely, the host 3 does not need to wait for a long period, until the host-initiated garbage collection ends.

Although the present disclosure is described using the above embodiment, as an example, the present disclosure is not limited thereto.

For example, in the above embodiment, the host 3 designates the time limit that can be used for the single host-initiated garbage collection. Instead of the time limit, the host 3 may designate a data size (e.g., page number) that is copied through the single host-initiated garbage collection.

For example, in another embodiment, the controller 14 may store data to different types of input blocks 44 during the host-initiated garbage collection, depending on the length of the HIGC_TIME. Specifically, the controller 14 may store data to a MLC block in the input block pool 440 during the host-initiated garbage collection when the HIGC_TIME is long enough to fill the input block 44, and the controller 14 may store data to an SLC block in the input block pool 440 during the host-initiated garbage collection when the HIGC_TIME is not long enough to fill the input block 44. As a result, even when the input block 44 of SLC type is not filled completely, the controller 14 can keep good data retention characteristics for the data written during the host-initiated garbage collection having a short HIGC_TIME (e.g., less than several hundred milliseconds) because reliability of a SLC block is much better than a MLC, TLC, and QLC blocks. In addition, the host-initiated garbage collection can be performed quickly enough when a short HIGC_TIME is specified by the host 3, because write performance of a SLC block is much better than write performance of a MLC, TLC, and QLC blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage apparatus comprising:
    a nonvolatile semiconductor memory including a plurality of physical blocks, a physical block being a unit of data erasure;
    a communication interface connectable to an external device; and
    a controller configured to
        upon receipt of a first command including a time parameter regarding garbage collection, received from a host to initiate garbage collection, carry out garbage collection for copying valid data stored in a target physical block to an input block among the physical blocks, and
        upon expiration of time indicated by the time parameter and receipt of a second command, carry out an access operation with respect to the input block among the physical blocks before carrying out garbage collection for copying other valid data stored in the target physical block to the input block.

2. The storage apparatus according to claim 1, wherein the controller carries out writing of write data received through the communication interface when a write command is received as the second command.

3. The storage apparatus according to claim 2, wherein the controller writes the valid data, the write data, and the other valid data in a physical block of the nonvolatile semiconductor memory in this sequence.

4. The storage apparatus according to claim 1, wherein the controller is configured to carry out the garbage collection in response to a command to carry out garbage collection that is received through the communication interface.

5. The storage apparatus according to claim 4, wherein the controller carries out the garbage collection during the time indicated by the time parameter.

6. The storage apparatus according to claim 4, wherein upon receipt of a third command including a designated size regarding garbage collection, the controller carries out garbage collection with respect to the designated size of valid data stored in the target physical block.

7. The storage apparatus according to claim 4, wherein the controller is further configured to select the target physical block for the garbage collection in response to the command to carry out garbage collection.

8. The storage apparatus according to claim 7, wherein the controller is further configured to maintain address mapping from a logical address to a physical location of the nonvolatile semiconductor memory with respect to each data unit stored in the nonvolatile semiconductor memory, and
    during garbage collection, the controller repeats copy of valid data from the target physical block to a destination physical block and update of the address mapping of the copied data, for each of data unit subjected to the garbage collection.

9. A storage system comprising a host and a storage device connected through a communication interface, wherein
    the storage device comprising a controller and a nonvolatile semiconductor memory including a plurality of physical blocks, a physical block being a unit of data erasure, and
    the host is configured to cause the controller to upon receipt of a first command including a time parameter regarding garbage collection, received from the host to initiate garbage collection, carry out garbage collection for copying valid data portion stored in a target physical block to an input block among the physical blocks, and upon expiration of time indicated by the time parameter and receipt of a second command, carry out an access operation with respect to the input block among the physical blocks before carrying out garbage collection for copying other valid data portion stored in the target physical block to the input block.

10. The storage system according to claim 9, wherein the host is configured to send a write command as the second command and write data through the communication interface to cause the controller to carry out writing of the write data.

11. The storage system according to claim 10, wherein the host is configured to cause the controller to write the valid data, the write data, and the other valid data in a physical block of the nonvolatile semiconductor memory in this sequence.

12. The storage system according to claim 9, wherein the host is configured to send the command including the time parameter to carry out garbage collection through the communication interface, to cause the controller to carry out the garbage collection.

13. The storage system according to claim 12, wherein the host is configured to send a designated size of data in association with a third command to carry out garbage collection, to cause the controller to carry out the garbage collection with respect to of the designated size of valid data stored in the target physical block.

14. A method of controlling a nonvolatile semiconductor memory including a plurality of physical blocks, a physical block being a unit of data erasure, the method comprising:

responsive to a first command including a time parameter regarding garbage collection, received from a host to initiate garbage collection, carrying out garbage collection for copying valid data portion stored in a target physical block to an input block among the physical blocks; and upon expiration of time indicated by the time parameter and receipt of a second command, carrying out an access operation with respect to the input block among the physical blocks before carrying out of garbage collection for copying other valid data stored in the target physical block to the input block.

15. The method according to claim 14, wherein the access operation includes writing of write data that are received after the garbage collection of the valid data and before the garbage collection of the other valid data.

16. The method according to claim 15, wherein the valid data, the write data, and the other valid data are written in a physical block of the nonvolatile semiconductor memory in this sequence.

17. The method according to claim 14, wherein the garbage collection of the valid data is carried out in response to the first command to carry out garbage collection, and the garbage collection of the other valid data is carried out in response to a third command to carry out garbage collection.

18. The method according to claim 17, wherein the garbage collection of the valid data is carried out during the time that is associated with the first command, and the garbage collection of the other valid data is carried out during a time that is associated with the third command.

19. The method according to claim 17, wherein upon receipt of a fourth command including a designated size regarding garbage collection, the designated size of valid data is copied to the input block among the physical blocks.

* * * * *